United States Patent [19]

Hamilton

[11] Patent Number: 4,768,340
[45] Date of Patent: Sep. 6, 1988

[54] AUTOMATIC DISPLACEMENT CONTROL FOR VARIABLE DISPLACEMENT MOTOR

[75] Inventor: Paul U. Hamilton, Palos Verdes Estates, Calif.

[73] Assignee: Allied-Signal Inc., Morris Township, Morris County, N.J.

[21] Appl. No.: 42,206

[22] Filed: Apr. 24, 1987

[51] Int. Cl.⁴ .............................................. F16D 31/02
[52] U.S. Cl. ........................................ 60/452; 60/445; 60/451; 60/489; 60/493
[58] Field of Search ................. 417/216, 217, 218; 60/452, 490, 491, 493, 489, 487, 445, 447, 449, 450, 451

[56] References Cited

U.S. PATENT DOCUMENTS

| 2,303,955 | 12/1941 | Rose | 92/13.5 |
| 2,550,966 | 5/1951 | Buchanan | 92/12.1 |
| 2,582,556 | 1/1952 | Morey | 60/493 |
| 2,702,007 | 2/1955 | Skinner | 92/12.1 |
| 3,213,763 | 10/1965 | Fearson et al. | 92/12.1 |
| 3,245,325 | 4/1966 | Giusti et al. | 92/13.1 |
| 3,430,538 | 3/1969 | Weiss | 92/13.5 |
| 3,489,094 | 1/1970 | Vaughan et al. | 417/53 |
| 3,579,979 | 5/1971 | Bosch | 60/491 |
| 3,734,225 | 5/1973 | Kobald et al. | 60/445 |
| 3,908,519 | 9/1975 | Born et al. | 92/12.2 |
| 4,481,769 | 11/1984 | Nagahara | 60/451 |
| 4,546,847 | 10/1985 | Abels | 60/492 |
| 4,559,778 | 12/1985 | Krusche | 417/217 |

FOREIGN PATENT DOCUMENTS

| 2817484 | 10/1979 | Fed. Rep. of Germany | 417/218 |
| 2825790 | 12/1979 | Fed. Rep. of Germany | 417/218 |
| 1003008 | 9/1965 | United Kingdom | 60/445 |
| 779661 | 11/1980 | U.S.S.R. | 60/445 |

Primary Examiner—Robert E. Garrett
Assistant Examiner—Therese Newholm
Attorney, Agent, or Firm—James W. McFarland; J. Henry Muetterties

[57] ABSTRACT

A variable displacement motor control responsive to the pressure differential across the motor, with provisions for reverse motor operation and for aiding load conditions.

25 Claims, 1 Drawing Sheet

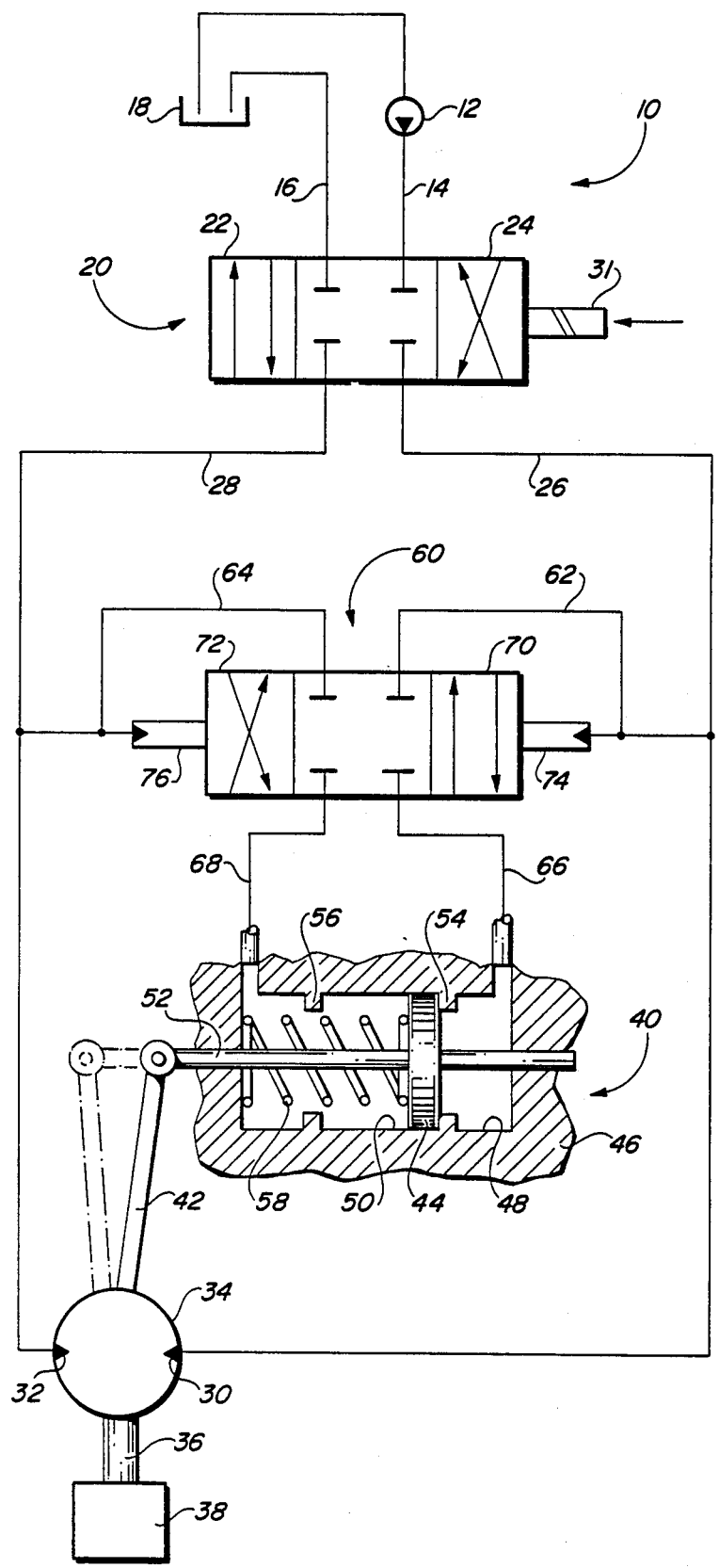

AUTOMATIC DISPLACEMENT CONTROL FOR VARIABLE DISPLACEMENT MOTOR

BACKGROUND OF THE INVENTION

This invention relates generally to hydraulic systems and more particularly to an automated control for adjusting the displacement of a variable displacement hydraulic motor, especially for use in aircraft actuation systems.

Variable displacement hydraulic motors find great utility in systems and application where the load requirement placed upon the motor may vary widely. In such event, substantial savings in pressurized motive flow can be achieved by minimizing motor displacement so that power required therefrom is relatively low. More specifically, in such instance it is conventional to reduce motor displacement when power load requirements are low in order to minimize the power utilized in the hydraulic actuation system.

In aircraft environment applications, economy of components, and simplicity of systems become paramount in order to minimize weight and size requirements. Another factor which must be considered during the operation cycle of such a hydraulic actuation system is the imposition of large aiding loads wherein the load is being driven in a particular direction as fast or faster than that dictated by the hydraulic control system. In such instance the hydraulic motor actually operates in a braking mode tending to resist the over running load.

A typical hydraulic control system of the type referred may utilize a speed sensor in order to control the hydraulic motor to operate at a preselected, desired speed. Particularly, such system would include an electronic sensor to sense motor output rotational speed, an electronic processing control system for analyzing the speed signal, comparing it to a desired speed signal and then generating a suitable electrical output signal that is applied to an electrohydraulic element, such as a servo valve, for operating a servo actuator to adjust motor displacement in order to maintain the desired motor speed. Such a system is typical and is characterized by a plurality of various components and elements in order to provide a control system of efficient operation.

SUMMARY OF THE INVENTION

It is a primary object of the present invention to provide improved method and apparatus for automatically controlling a variable displacement hydraulic motor in an manner minimizing the power consumed thereby in view of the loads imposed thereon, while reducing and minimizing the number of components and the complexity of the overall controls system.

A more particular object is to provide apparatus and method in accordance with the preceding object wherein minimum power is consumed by the motor by a control system which continuously adjusts motor displacement in relation to the pressure differential thereacross in a manner minimizing this pressure differential across the motor.

Another important object of the present invention is to provide a control system method and apparatus in accordance with the preceding objects wherein the actions of an aiding load placed upon the motor are automatically compensated for in controlling motor displacement to still minimize motor power consumption in such instance.

Briefly, the present invention contemplates a hydraulic control system having a source of pressurized motive fluid, a low pressure fluid return, a variable displacement hydraulic motor, and a reversing valve for controlling communication of the pressurized fluid flow to opposite fluid ports in the motor in order to drive the motor in opposite directions. For control of motor displacement, the present invention contemplates a double acting piston actuator whose opposed fluid chambers are communicating with the pair of fluid ports in the motor such that the fluid pressure differential across the motor is the parameter controlling motor displacement. Specifically, the pressure differential across the motor ports tends to always urge the actuator to maximum motor displacement position. Accordingly, a greater pressure differential across the motor causes increasing displacement in order to minimize this pressure differential in accordance with the load imposed upon the motor so as to minimize power consumed by the motor to that necessary to drive the load in the desired manner. A simple biasing spring urges the actuator to move the motor toward a minimum displacement position in opposition to the urging of the pressure differential across the motor.

To compensate for the reversing command valve, and to accomodate a situation wherein an aiding load is attempting to drive the motor in the selected direction, the present invention also includes an automatic shuttle valve which is responsive to the pressure differential across the motor in order to assure that the higher pressure is always ported to the displacement actuator so as to always drive the actuator to a maximum motor displacement position. In this manner motor displacement is increased to lower the differential pressure across the motor even when the latter is operated with an aiding load.

In this manner, the present invention provides a compact, economical, variable displacement hydraulic motor control utilizing a minimum number of elements while still assuring that the motor consumes only the minimum power required to drive an external load in the desired manner.

These and other objects and advantages of the present invention are specifically set forth in or will become apparent from the following detailed description of the invention when read in conjunction with the accompanying drawing.

BRIEF DESCRIPTION OF THE DRAWING

The sole FIGURE is a schematic representation of a hydraulic control system as contemplated by the present invention.

DETAILED DESCRIPTION OF THE PREFERRED EMBODIMENT

Referring more particularly to the drawing, a schematically depicted hydraulic system 10 includes a source of pressurized fluid illustrated as a hydraulic pump 12 for delivering high pressure fluid to a first duct 14. A low pressure return duct 16 returns low pressure fluid to a reservoir 18. A reversing command control valve 20 is selectively shiftable between the "through flow" and "cross flow" positions 22 and 24 to selectively connect the high pressurized fluid flow duct 14 respectively with a fluid carrying duct 26 or 28. The valve 20 illustrated is selectively energized and shifted between its positions 22 and 24 by a solenoid 31. Ducts 26 and 28 respectively communicate with opposed fluid ports 30 and 32 of a variable displacement hydraulic motor 34. Preferably motor 34 may be, for example, an axial piston motor with a shiftable wobble plate for adjusting the displacement thereof. Motor 34 is operable to translate the power of the pressure fluid applied thereto to rotation of an output shaft 36 to drive an external load 38.

Associated with motor 34 is a displacement control means generally denoted by the numeral 40 which includes a displacement control member 42 that may be, for example, directly connected to the wobble plate of an axial piston motor for adjusting the position the angular inclination of the wobble plate in order to vary the displacement of motor 34. The displacement control means 40 may further include a hydraulic actuator comprising a piston 44 situated within a bore of a housing 46 to define a pair of opposed fluid receiving chambers 48 and 50. An actuator rod or shaft 52 extends from piston 44 to be connected with the displacement control member 42. Associated with the housing 46 may be limit stops 54 and 56 for controlling movement of the displacement member 42 between a minimum motor displacement position illustrated in solid lines in the drawing, and a maximum motor displacement position illustrated in phantom lines. Biasing means in the form of a helical coil spring 58 extends between the housing 46 and piston 44 to urge the latter towards stop 54 and thus urge the displacement control means to move towards the minimum displacement position illustrated.

In addition to command reversing control valve 20 and the displacement control means 40, the control for the hydraulic system 10 also includes a shuttle valve means 60 for automatically controlling communication of the pair of opposed fluid chambers 48 and 50 with the motor fluid ports 30 and 32. For this purpose, valve 60 is operable to control communication between ducts 62 and 64 respectively communicating with ducts 26 and 28, to passages 66, 68 which lead to the fluid chambers 48 and 50. Shuttle valve 60 is shiftable between a "through flow" position 70 and a "cross flow" position 72 to respectively communicate fluid chamber 48 with motor port 30 or motor port 32.

Valve 60 is automatically shiftable between its straight through and cross flow positions and is hydraulically actuated by hydraulic actuators 74, 76 at opposite ends thereof which are respectivedly exposed to the fluid pressure associated with motor port 30 and motor port 32. From this it will be seen that the shuttle valve 60 is automatically positioned between its straight through and cross flow positions 70, 72 by the difference in pressure or pressure differential existing between the motor ports 30 and 32 at any particular operational condition of the hydraulic motor 34.

In operation, to selectively rotate shaft 36 in one direction and accordingly move load 38 in the associated direction, valve 20 is shifted to its through flow position 22 to communicate the pressurized fluid flow in duct 14 with motor port 30 while connecting the opposite motor port 32 ultimately with the low pressure return duct 16. In the instance of a standard load tending to resist the pressurized fluid flow delivered to port 30, a pressure differential builds up between ports 30 and 32 in order to drive the motor in the desired direction, resulting in a substantially higher pressure in port 30 than in port 32. The greater the load, of course, the greater is the pressure differential built up between ports 30 and 32 to increase the power consumed by the motor in appropriately driving the load 38 in the desired manner.

This pressure differential acts to shift shuttle valve 60 leftwardly as illustrated in the drawing to its through flow position 70 so that the higher pressure in motor port 30 is communicated to fluid chamber 48, while the lower pressure in motor port 32 is communicated to the opposite fluid chamber 50. The magnitude of the pressure differential between motor ports 30 and 32 thus drives piston 44 leftwardly in the drawing to tend to urge the displacement control member 42 toward the maximum displacement position of the fluid motor, and in opposition to the urgings of biasing spring 58.

As the magnitude of the pressure differential, with pressure in motor port 30 higher than that in motor port 32, varies depending upon the load imposed upon motor 34, the displacement control means are automatically adjusted to change motor displacement to correspond with the load imposed upon the motor. More specifically, with increased motor load causing greater pressure differential across the motor, the displacement control means is moved toward its maximum displacement position to produce higher motor torque from the motor 34. Since the power developed by the motor 34 is a direct function of the pressure differential thereacross and its displacement, it will be seen that the motor creates conditions of maximum power when the load imposed upon the motor so demands. Similarly, if the load upon the motor is substantially less, a lower pressure differential is created across motor ports 30 and 32. The reduced pressure differential between fluid ports 30 and 32 is transmitted to chambers 48 and 50, thereby permitting piston 44 to travel rightwardly toward a minimum displacement position. Thus, motor displacement and the pressure differential thereacross vary proportionally with one another so that the motor 34 at all times will consume only the power needed or required to drive load 38 in the manner desired.

Still assuming that valve 20 has been actuated to its through flow position 22, conditions often exist wherein an aiding load can be imposed upon motor 34. In this instance, the load 38 being driven by the motor 34 is already moving in the desired direction and probably at a speed equal to or greater than that desired. In such instance, the pressure differential across motor ports 30, 32 will reverse such that motor 34 is actually operating in a braking mode tending to hold back or reduce the speed of the overrunning load 38.

It is important to note that shuttle valve 60 automatically senses the overrunning or aiding load condition by being responsive to the pressure differential across ports 30, 32. That is, when pressure in port 32 exceeds that in port 30 the shuttle valve 60 is automatically shifted rightwardly in the drawing towards its cross flow position 72 so that the higher pressure now existing in motor port 32 is transmitted to fluid chamber 48, while the lower pressure in motor port 30 is communicated to the opposing chamber 50. Again, as the magnitude of this reverse pressure differential increases, a greater pressure differential is applied across piston 44 to urge it towards a higher displacement position and ultimately toward the maximum motor displacement position. Accordingly, motor displacement is again increased in accord with the magnitude of the pressure differential across the motor, albeit a reverse pressure differential, such that the power consumed by the motor 34 in this braking mode again corresponds to that required in order to control the load 38 to operate in the desired manner. As a result, again the control system automatically adjusts motor displacement to match the power requirements placed thereon by the overrunning load 38.

In the foregoing it will be seen that the present control system provides an automatic control of the displacement of the motor 34 so as to minimize the power consumed thereby in driving an external load 38 in the desired manner. Yet this automatic control is highly simplified in nature requiring essentially only the automatic shuttle valve 60 operably connected with the displacement control means 40 in the manner described. Accordingly, the present invention presents a highly simplified, economical hydraulic control system effective in adjusting the power consumed by the hydraulic system to match that required by the load imposed thereupon.

When it is desired to operate the motor 34 to drive the load 38 in an opposite direction to that described previously, the command control valve 20 is shifted oppositely to its cross flow position 24 such that the pressurized motive fluid flow from duct 14 is delivered to motor port 32 while the opposite motor port 30 is connected to the low pressure return duct 16. This system operates as described previously but in reverse directions, i.e., with pressure in port 32 increasing to a level above that in motor port 30 to drive the conventional load 38. Valve 60 shifts its cross flow position 72 such that the higher pressure in motor port 32 is delivered to fluid chamber 48 to again urge the displaced control number toward a higher displacement position. Imposition of an aiding load reversely increases pressure in motor port 30 to a higher level than in motor port 32, and shifts valve 60 to its straight-through position 70 so that the pressure differential again urges the displacement control towards the maximum displacement position.

It will thus be seen that the invention provides the same control function while permitting the motor 34 to operate in reverse directions to drive the load 38 in reverse directions by simple inclusion of a reversing control valve 20. An attendant benefit to this system and in particular to the automatic operation of the shuttle valve 60 responsive to the pressure differential across motor ports 30, 32, is that variable displacement motor 34 is preferably constructed such that it never reaches a zero displacement position. Specifically, the limit stop 54 is positioned such that the minimum displacement position of the motor 34 is slightly above zero displacement. Thus, the present invention provides reversible motor control without requiring the wobble plate or swash plate associated with a variable displacement axial piston motor from having to reach or pass through the zero displacement position. Accordingly, the well known problems associated with the zero displacement position of the motor 34 are avoided.

From the foregoing it will be seen that the present invention provides an improved control system by automatically communicating the higher pressure of the two motor ports 30, 32 to fluid chamber 48 such that the pressure differential across the motor always drives the displacement control means 40 towards the maximum displacement position, regardless of the reversing of control valve 20 and regardless of the imposition of an aiding load upon the motor in either direction of operation.

Thus the present invention provides an improved control system and method wherein both the magnitude and the direction of the pressure differential across motor 34 are sensed. Specifically, the magnitude of the pressure differential is impressed across piston 44 to accordingly adjust motor displacement. The "direction" of the pressure differential, i.e., whether motor port 30 is greater than motor port 32 pressure or vice versa, is sensed by shuttle valve 60 so that the higher pressure of the pressure differential is always ported into chamber 48. Thus by sensing the "direction" of the pressure differential, and accordingly shifting shuttle valve 60 between its cross flow and straight through positions, the present invention always assures that the piston 44 is shifted in accordance with the magnitude of the pressure differential regardless of its direction. Thus, the method of the present invention includes selectively reversing communication of the motor ports with a pressurized fluid source, and adjusting the displacement control in relation to the sensed magnitude of the pressure differential. Further, fluid flow is reversed to the displacement control member in relation to the sensed direction of the pressure differential so that the pressure differential always urges the displacement control member towards its maximum displacement position. Continuous biasing of the displacement control member toward the minimum displacement position by the biasing means 58 opposes the actions of the pressure differential acting upon the displacement control member.

While a preferred embodiment of the invention has been set above in detail, it is to be understood that the above is exemplary in nature and not limiting to the scope and spirit of the invention as set forth in the appended claims.

Having described the invention with sufficient clarity that those skilled in the art may make and use it, I claim:

1. A hydraulic system comprising:
   first and second ducts adapted to be connected respectively to a source of fluid pressure and a low pressure fluid return;
   a variable displacement motor having a pair of ports;
   a reversing valve interposed between said motor and said first and second ducts for selectively reversing connections between said pair of ports and said first and second ducts to selectively drive said motor in opposite directions;
   displacement control means operably associated with said motor for altering the displacement thereof, said displacement control means including opposed fluid chambers operably communicating with said pair of ports for impressing the pressure differential between said pair of ports upon said displacement control means to adjust the latter;
   biasing means engaging said displacement control means for urging the latter in a direction reducing displacement of said motor; and
   shuttle valve means, responsive to said pressure differential between said pair of ports, for automatically reversing communication between said opposed fluid chambers and said pair of ports whereby said pressure differential always urges said displacement control means in a direction increasing displacement of said motor.

2. A hydraulic system as set forth in claim 1, wherein said displacement control means comprises a displacement control member operably engaging said motor and shiftable between minimum and maximum motor displacement positions, and a hydraulic actuator operably connected to said member to shift the latter, said pressure differential always urging said member toward said maximum motor displacement position in opposition to said biasing means.

3. A hydraulic system as set forth in claim 2, wherein said hydraulic actuator comprises a piston, said opposed fluid chambers located on opposite sides of said piston.

4. A hydraulic system as set forth in claim 3, wherein said shuttle valve means comprises a hydraulically actuated valve shiftable between a pair of positions reversely communicating said opposed fluid chambers with said pair of ports, said valve being shifted between said pair of positions by said pressure differential.

5. A hydraulic system as set forth in claim 2, wherein said variable displacement motor is a rotary axial piston motor, and said displacement control member includes a variably inclinable wobble plate.

6. A hydraulic system comprising:
first and second ducts adapted to be connected respectively to a source of fluid pressure and a low pressure fluid return;
a variable displacement motor having a pair of ports;
a reversing valve interposed between said motor and said first and second ducts for selectively reversing connections between said pair of ports and said first and second ducts to selectively drive said motor in opposite directions;
displacement control means operably associated with said motor for altering the displacement thereof, said displacement control means including a fluid chamber arranged whereby pressure therein urges said displacement control means only in a direction increasing displacement of said motor;
biasing means engaging said displacement control member for urging the latter in a direction decreasing displacement of said motor; and
means, responsive to the pressures in said pair of ports, for automatically controlling communication of said fluid chamber with said pair of ports in a manner assuring that said fluid chamber always communicates with the one of said pair of ports carrying the higher pressure fluid.

7. A hydraulic system comprising:
first and second ducts adapted to be connected respectively to a source of fluid pressure and a low pressure fluid return;
a variable displacement hydraulic motor having a pair of ports and a displacement control member shiftable to alter the displacement of said motor between minimum and maximum displacement positions;
a reversing control valve communicating with said first and second ducts and said pair of ports for selectively reversing connection of said first and second ducts with said pair of ports to selectively drive said motor in opposite directions of rotation;
a hydraulic actuator including a piston operably connected to said displacement control member for shifting the latter, and a pair of opposed fluid chambers on opposite sides of said piston operably communicating with said pair of ports at locations downstream of said reversing control valve for impressing the pressure differential between said pair of ports across said piston;
biasing means engaging said piston for urging the latter to move said displacement control member toward said minimum displacement position; and
shuttle valve means, responsive to said pressure differential between said pair of ports, for automatically reversing the communication between said opposed fluid chambers and said pair of ports whereby said pressure differential always urges said piston to move said displacement control member toward said maximum displacement position.

8. A hydraulic system comprising:
first and second ducts adapted to be connected respectively to a source of fluid pressure and a low pressure fluid return;
a variable displacement hydraulic motor having a pair of ports and a displacement control member shiftable to alter the displacement of said motor between minimum and maximum displacement positions;
a reversing control valve communicating with said first and second ducts and said pair of ports for selectively reversing connection of said first and second ducts with said pair of ports to selectively drive said motor in opposite directions of rotation;
hydraulic actuator means for shifting said displacement control member, including a pair of opposed fluid chambers operably communicating with said pair of ports for impressing the pressure differential between said pair of ports upon said actuator means;
biasing means engaging said actuator means for urging the latter to move said displacement control member toward said minimum displacement position; and
means, responsive to said pressure differential, for automatically reversing communication between said pair of opposed fluid chambers and said pair of ports whereby said pressure differential always urges said actuator means to move said displacement control member toward said maximum displacement position.

9. In a hydraulic system having a source of fluid pressure, a low pressure fluid return, and a variable displacement motor having a pair of ports, a control system comprising: a reversing valve shiftable between positions connecting one and the other of said pair of ports with said source of fluid pressure; displacement control means associated with said motor for varying the displacement of said motor, said displacement control means including a pair of fluid chambers arranged to communicate with said pair of ports such that the pressure differential between said pair of ports acts to adjust said displacement control means; biasing means for urging said displacement control means in a direction reducing displacement of said motor; and valve means responsive to said pressure differential for automatically reversing communication of said pair of ports with said pair of fluid chambers such that said pressure differential always acts to urge said displacement control means in a direction increasing displacement of said pump.

10. In a hydraulic system having a source of pressurized fluid and a low pressure fluid return, a method for controlling operation of a variable displacement hydraulic motor having a pair of fluid ports and a hydraulically responsive displacement control member shiftable between minimum and maximum positions respectively developing minimum and maximum motor displacement, said method comprising the steps of:
selectively reversing communication of said pair of ports with said source and said return to drive said motor in opposite directions;

sensing the magnitude and the direction of the pressure differential between said pair of ports;

adjusting the displacement control member in relation to the sensed magnitude of the pressure differential;

reversing flow of pressurized actuating fluid to the displacement control member in relation to the sensed direction of the pressure differential such that the displacement control member is always urged toward said maximum position in relation to said sensed magnitude during said adjusting step regardless of said sensed direction of the pressure differential; and continuously biasing the displacement control member toward said minimum position.

11. In a hydraulic system having a source of pressurized fluid and a low pressure fluid return, a method for controlling operation of a variable displacement hydraulic motor having a pair of fluid ports and a hydraulically responsive displacement control member shiftable between minimum and maximum positions respectively developing minimum and maximum motor displacement, said method comprising the steps of:

selectively reversing communication of said pair of ports with said source and said return to drive said motor in opposite directions;

impressing the pressure differential between said pair of ports upon the displacement control member to adjust motor displacement in relation to the magnitude of the pressure differential;

automatically reversing communication between said pair of ports and the displacement control member such that the pressure differential always urges the displacement control member toward said maximum position; and continuously biasing the displacement control member toward said minimum position.

12. The hydraulic system as set forth in claim 6, wherein said displacement control means comprises a displacement control member operably engaging said motor and shiftable between minimum and maximum motor displacement positions and a hydraulic actuator operably connected to said member to shift the latter.

13. The hydraulic system as set forth in claim 12, wherein said hydraulic actuator includes a piston within said fluid chamber thereby creating fluid chambers on opposite sides of said piston.

14. The hydraulic system as set forth in claim 13, wherein said means for automatically controlling comprises a hydraulically actuated valve shiftable between a pair of positions reversely communicating said opposed fluid chambers with said pair of ports, said valve being shifted between said pair of positions by the pressure differential in said pair of ports.

15. The hydraulic system as set forth in claim 12, wherein said variable displacement motor is a rotary axial piston motor and said displacement control member includes a variable inclinable wobble plate.

16. The hydraulic system as set forth in claim 7, wherein said variable displacement motor is a rotary axial piston and said displacement control member includes a variably inclinable wobble plate.

17. The hydraulic system as set forth in claim 8, wherein said means for automatically reversing communication comprises a hydraulically actuated valve shiftable between a pair of positions reversely communicating said opposed fluid chambers with said pair of ports, said valve being shifted between said pair of positions by said pressure differential.

18. The hydraulic system as set forth in claim 8, wherein said variable displacement motor is a rotary axial piston motor and said displacement control member includes a variable inclinable wobble plate.

19. The control system according to claim 9, wherein said displacement control means comprises a displacement control member operably engaging said motor and shiftable between a minimum and maximum motor displacement positions and a hydraulic actuator operably connected to said displacement control member to shift the latter.

20. The control system according to claim 19, wherein said hydraulic actuator comprises a piston connected to said displacement control means and located between said pair of fluid chambers.

21. A hydraulic system comprising:

first and second ducts adapted to be connected respectively to a source of fluid pressure and a low pressure fluid return;

a variable displacement motor having a pair of ports;

displacement control means operably associated with said motor for altering the displacement thereof, said displacement control means including a fluid chamber arranged whereby pressure therein urges said displacement control means only in a direction increasing displacement of said motor;

biasing means engaging said displacement control member for urging the latter in a direction decreasing displacement of said motor; and means, responsive to the pressures in said pair of ports, for automatically controlling communication of said fluid chamber with said pair of ports in a manner assuring that said fluid chamber always communicates with the one of said pair of ports carrying the higher pressure fluid.

22. The hydraulic system as set forth in claim 21, wherein said displacement control means comprises a displacement control member operably engaging said motor and shiftable between minimum and maximum motor displacement positions and a hydraulic actuator operably connected to said member to shift the latter.

23. The hydraulic system as set forth in claim 22, wherein said hydraulic actuator includes a piston within said fluid chamber thereby creating fluid chambers on opposite sides of said piston.

24. The hydraulic system as set forth in claim 23, wherein said means for automatically controlling comprises a hydraulically actuated valve shifatable between a pair of positions reversely communicating said opposed fluid chambers with said pair of ports, said valve being shifted between said pair of positions by the pressure differential in said pair of ports.

25. The hydraulic system as set forth in claim 24, wherein said variable displacement motor is a rotary axial piston motor and said displacement control member includes a variable inclinable wobble plate.

* * * * *